US008615968B2

(12) United States Patent
Kalkanoglu et al.

(10) Patent No.: US 8,615,968 B2
(45) Date of Patent: *Dec. 31, 2013

(54) SHINGLE WITH REINFORCEMENT LAYER

(71) Applicant: CertainTeed Corporation, Valley Forge, PA (US)

(72) Inventors: Husnu M. Kalkanoglu, Swarthmore, PA (US); Stephen A. Koch, Collegeville, PA (US)

(73) Assignee: CertainTeed Corporation, Valley Forge, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/855,820

(22) Filed: Apr. 3, 2013

(65) Prior Publication Data
US 2013/0219819 A1 Aug. 29, 2013

Related U.S. Application Data

(63) Continuation of application No. 13/788,029, filed on Mar. 7, 2013, which is a continuation of application No. 13/462,159, filed on May 2, 2012, now Pat. No. 8,409,689, which is a continuation of application No. 12/857,868, filed on Aug. 17, 2010, now Pat. No. 8,173,243, which is a continuation of application No. 12/422,506, filed on Apr. 13, 2009, now Pat. No. 7,781,046, which is a continuation of application No. 11/421,893, filed on Jun. 2, 2006, now Pat. No. 7,537,820, which is a continuation-in-part of application No. 10/871,911, filed on Jun. 18, 2004, now Pat. No. 7,118,794, which is a continuation of application No. 10/288,747, filed on Nov. 6, 2002, now Pat. No. 6,758,019.

(51) Int. Cl.
E04B 1/00 (2006.01)
E04G 21/00 (2006.01)
E04G 23/00 (2006.01)

(52) U.S. Cl.
USPC ............ 52/748.1; 52/518; 52/555; 52/559; 428/323

(58) Field of Classification Search
USPC .......... 52/518, 555, 559, 520, 543, 546, 544, 52/547, 748.1; 428/323, 143, 40.1; 427/143, 187
See application file for complete search history.

(56) References Cited

U.S. PATENT DOCUMENTS

| 5,822,943 | A  | * | 10/1998 | Frankoski et al. | ............ | 52/518 |
| 6,758,019 | B2 | * | 7/2004  | Kalkanoglu et al. | ........... | 52/553 |
| 7,118,794 | B2 | * | 10/2006 | Kalkanoglu et al. | ......... | 428/143 |
| 7,537,820 | B2 | * | 5/2009  | Kalkanoglu et al. | ......... | 428/143 |
| 7,781,041 | B2 | * | 8/2010  | Broyles | ...................... | 428/40.1 |
| 8,173,243 | B2 | * | 5/2012  | Kalkanoglu et al. | ......... | 428/143 |
| 8,383,228 | B2 | * | 2/2013  | Kalkanoglu et al. | ......... | 428/143 |
| 8,409,689 | B2 | * | 4/2013  | Kalkanoglu et al. | ......... | 428/143 |

* cited by examiner

Primary Examiner — Chi Q Nguyen
(74) Attorney, Agent, or Firm — Paul & Paul

(57) ABSTRACT

A shingle, a method of making it, and a roof embodying the shingle is provided, in which an exterior surface of the shingle is provided with an attached reinforcement layer through which fasteners may be applied when the shingle is applied to a roof.

18 Claims, 10 Drawing Sheets

SHINGLE WITH REINFORCEMENT LAYER

CROSS-REFERENCE TO RELATED APPLICATIONS

This is a continuation of U.S. application Ser. No. 13/788,029 filed Mar. 7, 2013, which, in turn is a continuation of U.S. application Ser. No. 13/462,159 filed May 2, 2012 now U.S. Pat. No. 8,409,689, which, in turn, is a continuation of U.S. application Ser. No. 12/857,868 filed Aug. 17, 2010, now U.S. Pat. No. 8,173,243, which in turn is a continuation of U.S. application Ser. No. 12/422,506 filed Apr. 13, 2009, now U.S. Pat. No. 7,781,046 which in turn is a continuation of U.S. application Ser. No. 11/421,893, filed Jun. 2, 2006, now U.S. Pat. No. 7,537,820 which, in turn, is a continuation-in-Part of U.S. application Ser. No. 10/871,911, filed Jun. 18, 2004, now U.S. Pat. No. 7,118,794, which, in turn is a continuation of application Ser. No. 10/288,747, filed Nov. 6, 2002, now U.S. Pat. No. 6,758,019.

BACKGROUND OF THE INVENTION

In the manufacture of shingles, it has been known that when shingles are subjected to strong winds, the winds can engage the lower edges or tab portions of the shingles, and bend them upwardly.

On occasion, under strong winds, the tabs can bend upwardly in amounts sufficient that the inherent, internal resistance to substantial bending and perhaps cracking, can be overcome, in that the mat that is formed internally of the shingle, and the asphaltic material on the surfaces of the shingle, may not be sufficient to withstand certain wind conditions.

Various approaches have been made to resist shingle failure via cracking and the like, not all with substantial success.

For example, strips of adhesive material along lower ends of tabs of shingle have been applied, which, when subjected to hot weather conditions, soften an amount sufficient that such adhesive will adhere to the next-subjacent shingle on a roof, eventually harden and thereafter resist upward deflection of shingle tabs under severe wind conditions. However, such adhesive sometimes dries out, or becomes brittle over time, offering reduced adhesion. In other cases, strong wind conditions can exist during high temperature situations when such adhesive located under tabs remains soft, and thus the adhesive does not function in its intended manner.

Other approaches have resorted to thickening the mat and/or asphaltic material, to offer internal resistance to bending, but nonetheless, failures due to wind-related bending of tabs of shingle continue to exist.

SUMMARY OF THE INVENTION

The present invention is directed toward providing a shingle, wherein a separate, exterior reinforcement layer is provided outside the rear surface of the shingle, with such layer comprising a material that is not coated or covered by any thick layer of asphalt or the like.

Accordingly, it is an object of this invention to provide a novel shingle having a layer on the lower surface of the shingle, that comprises a reinforcing material.

It is a further object of the invention to accomplish the above objects, wherein the reinforcement layer comprises a scrim material.

It is another object of this invention to accomplish the above objects, wherein the reinforcing material extends into either or both of the tab portion of the shingle and the headlap portion of the shingle.

It is a further object of this invention to accomplish the object above, wherein the reinforcing material extends into a nailing zone or other fastening zone of the shingle through which nails or other fasteners pass upon securing the shingle to a roof.

It is a further object of this invention to provide a method of making shingles in accordance with the objects set forth above.

Other objects and advantages of the present invention will be readily understood upon a reading of the following brief descriptions of the drawing figures, detailed descriptions of the preferred embodiments and the appended claims.

BRIEF DESCRIPTIONS OF THE DRAWING FIGURES

DETAILED DESCRIPTIONS OF THE PREFERRED EMBODIMENTS

Figure 1:
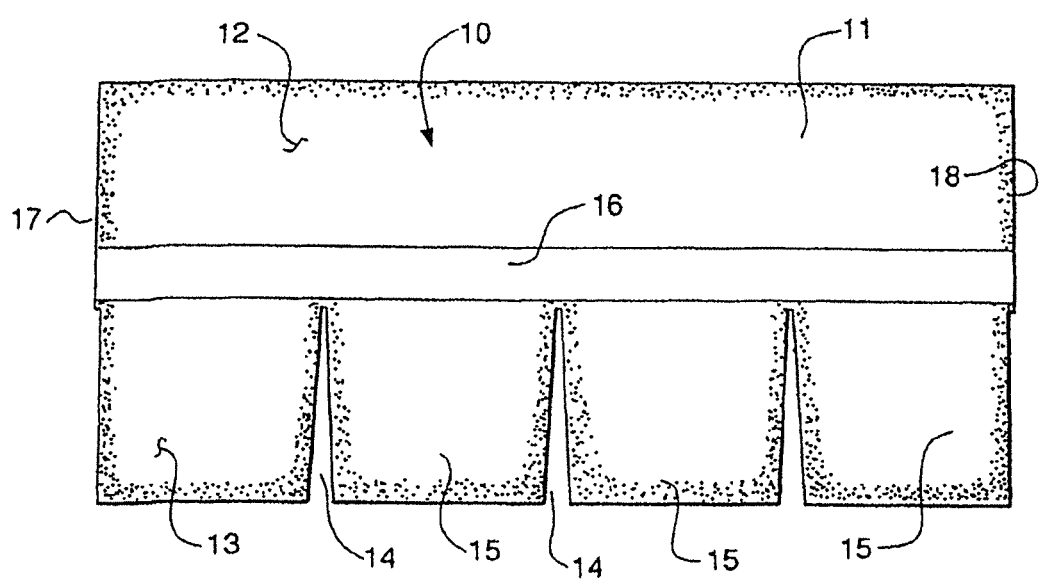
FIG. 1 is a rear elevational view of a shingle made in accordance with the prior art.

Referring now to the drawings in detail, reference is first made to FIG. 1, wherein a prior art shingle is illustrated as comprising a shingle generally designated by the numeral 10, constructed as a mat of preferably fiberglass mesh, having asphalt, or some other form of bitumen material impregnated therein, and forming layers on each surface thereof, with a granular material on each exposed surface. On the upper exposed surface, will be granules of a size desired to resist sun and other weather conditions, and on the opposite, or under-surface 11, there will be preferably smaller granules of a mica, sand or like material, for example. The shingle 10 has a headlap portion 12 and a tab portion 13, having slotted openings 14 dividing the tab portion 13 into a number of discrete tabs 15. On the undersurface 11 there is provided preferably but optionally a sheet of release paper or tape 16, which is removed when the shingle is installed on a roof, but which, for stacking shingles for shipment prevents the shingle from sticking to a subjacent shingle in the stack, which subjacent shingle has a similarly located strip of adhesive material, such as more bitumen, extending longitudinally from edge 17 to edge 18, on the front surface of the subjacent shingle.

The basic shingle of FIG. 1 may be made in accordance with the teaching of U.S. Pat. Nos. 6,092,345, 6,145,265, or 5,822,943, the complete disclosures of all of which are herein incorporated by reference.

Figure 2:
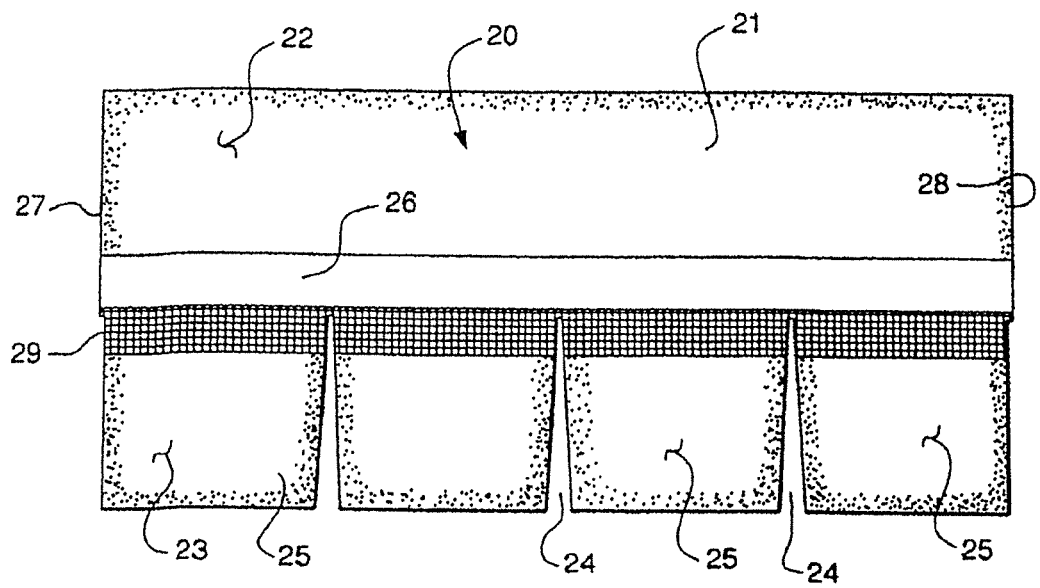
FIG. 2 is an illustration like that of FIG. 1, but wherein the shingle is shown to have a reinforcement layer applied to the rear surface thereof, in accordance with the present invention.
Figure 2A:
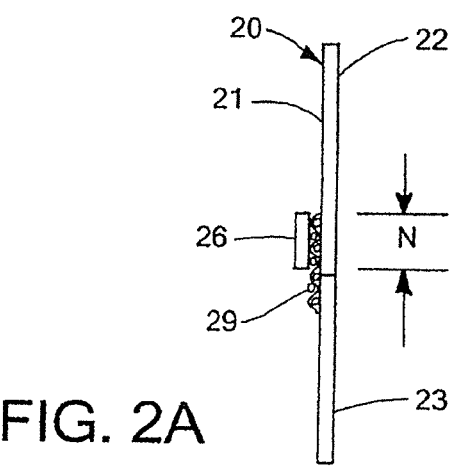
FIG. 2A is a right side view of the shingle of FIG. 2.

With specific reference to FIGS. 2 and 2A, it will be sent that a shingle 20 is presented, having a rear surface 21, with a release strip 26 running from left to right across the lower end of a headlap portion 22, between edges 27 and 28, and with the tab portion 23 of the shingle 20 comprising a plurality of tabs 25 separated by vertical, spaced apart slots 24.

A nailing zone "N" exists on the front surface of the shingle 20, generally located above the release tape or strip 26, running between edges 27, 28 above the slots 24. Essentially, the shingle 20 is similar to that of the shingle 10 of FIG. 1, but with a reinforcement layer, preferably of fiberglass, of a width between approximately 3 and 8 cm, and preferably about 2½ inches, that may comprise a scrim layer 29 is added on the rear 21 of the shingle 20, across the upper end of the tab portion 23, and across the lower end of the headlap portion 22, as shown in FIG. 2, covering the area shown in FIG. 2, as well as the area disposed beneath the release strip 26, along the lower end of the headlap portion 22 between edges 27 and 28, as shown in FIG. 2. During the construction of the shingle of FIG. 2, the reinforcement layer 29 is thus applied before the release tape 26 is applied.

Thus, the reinforcement layer 29 may be a fiberglass scrim and will preferably be a woven construction, involving woven strands disposed at right angles to each other, with a preferred density of, for example nine strands in the vertical direction and nine strands in the horizontal direction per square inch of scrim ($9\times9$ per $in^2$).

Figure 3:
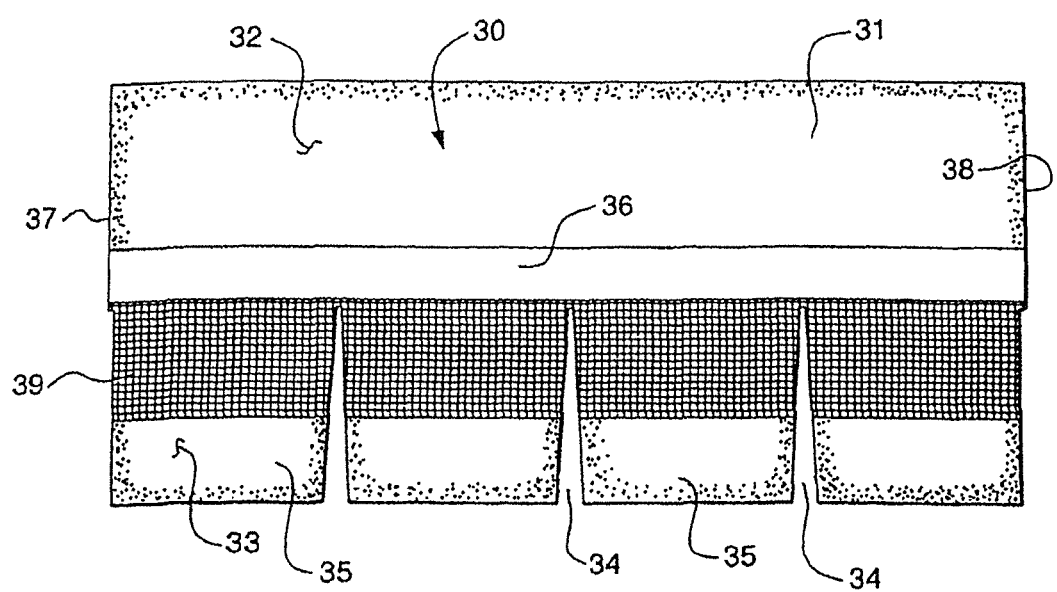
FIG. 3 is an illustration like that of FIG. 2, but wherein the reinforcement layer extends farther into the tab portion of the shingle than in the embodiment of FIG. 2.

With reference to FIG. 3, it will be seen that a shingle 30, much like the shingle 20, is provided, having a rear surface 31, having a headlap portion 32 and tab portion 33, with the tab portion comprising a plurality of tabs 35 separated by slotted openings 34, with a release strip 36 extending between left and right edges 37 and 38, and with a scrim 39 located beneath the release strip 36 as with respect to the embodiment of FIG. 2, but extending downwardly farther into the tabs 35, as shown, in that the scrim 39 is essentially about 6 inches wide, running from the upper edge of the release strip 36, into the tabs, as shown.

It will be apparent that other lengths of scrim 29, 39, will be appropriate depending upon the desired resistance to bending under wind conditions, as will be addressed hereinafter.

The scrim layers 29, 39, will not be coated with a bitumen or other asphaltic material, nor will they have granules applied thereto, such that the filaments of the scrim 29, 39, especially those extending vertically as shown in FIGS. 2 and 3, can resist bending and resist failure in the form of the likelihood of forming horizontal cracks across the upper end of the tab portion of the shingle, when the shingle is bent upwardly within its elastic limit under forces applied by winds or other upward lifting forces.

The scrim may have a density other than the $9\times9$ per $in^2$. addressed above, such as but not limited to $8\times8$ per $in^2$ or $7\times7$ per $in^2$, and may be of various compositions other than fiberglass, such as polyester, polypropylene and/or nylon. In lieu of a scrim, the reinforcement layers 29, 39 may comprise woven or nonwoven thin fabric, plastic film, paper, parchment, foil or the like, either embedded in the asphaltic layer on the rear of the shingle or adhered to the rear of the shingle by an additional post-applied thin layer of asphaltic or non-asphaltic adhesive. The reinforcement layer 29, 39, will be adhered to the rear surface 21, 31 of the shingles of this invention, by means of any suitable adhesive, such as a bitumen or the like, or any other adhesive.

Figure 4:
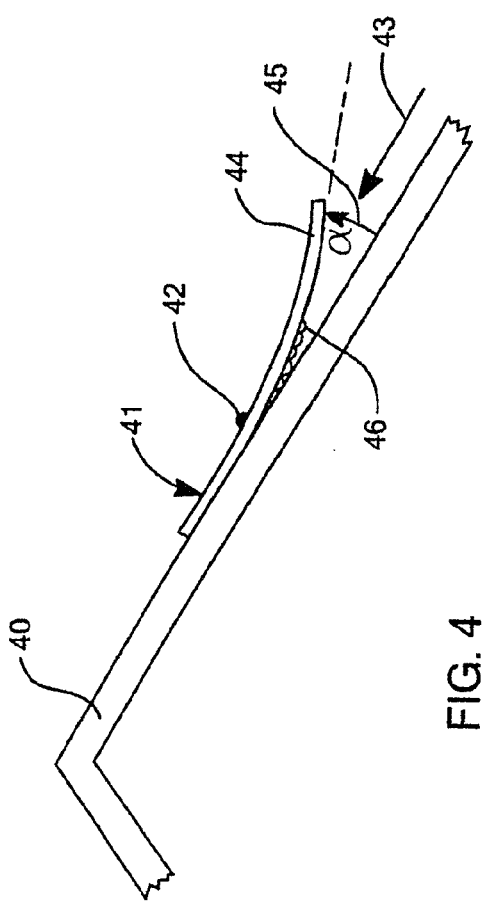
FIG. 4 is a side view of the shingle of this invention shown resisting torque applied to the tab portion of the shingle under a wind-lifting force that bends the shingle upwardly at approximately 45°.

With reference now to FIG. 4, it will be seen that a roof 40 is fragmentally illustrated, having a shingle 41 fastened thereto by means of a nail, staple, 42 or the like, through the nailing or fastening zone of the shingle as described above with reference to FIG. 2, and therefore through the reinforcement layer 29. When wind forces occur in the general direction indicated by the arrow 43 in FIG. 4, such that they tend to bend the tab portion 44 of the shingle upwardly to an angle "a", as shown by the dotted arrow 45, the scrim 46 applied to the undersurface of the shingle 41 will tend to resist upward bending of the shingle tab portion 44, largely because of the resistance to such bending that is provided by the reinforcement layer 29, 39 as shown in FIGS. 2 and 3 which will resist stretching and thereby inhibit bending.

It will be understood that up to some level of force applied by wind in the direction 43, the shingle tab portion 44 will bend within its elastic limit in accordance with Hook's law. In this regard, any given weight of shingle, under any particular conditions, will have its own modulus of elasticity, which is a measure of the stiffness or rigidity of the shingle, and within which the shingle will return to its original, flat condition when the force of wind is removed.

Figure 4A:
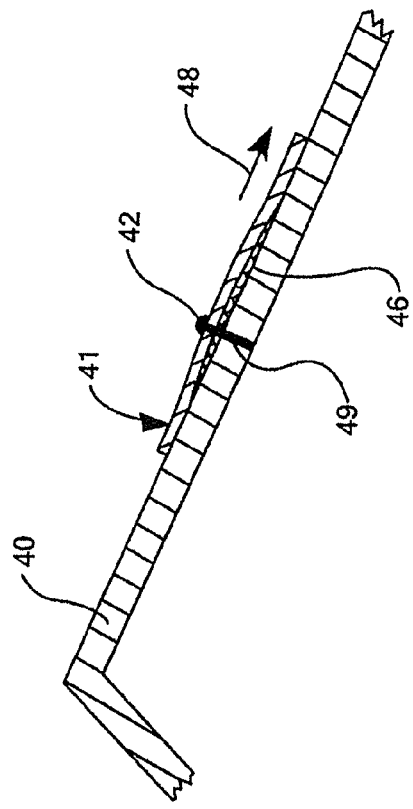
FIG. 4A is a vertical sectional view of the shingle of FIG. 4, as applied to a roof of steep slope.

With reference to FIG. 4A, the vertical section of a shingle 41, as applied to a roof 40 is illustrated, with the roof 40 being similar to that set forth above and the attendant description thereof. It will be seen that the reinforcement material 46, underlying the shingle 41, is engaged by the nail or other fastener 42 that is applied through the nailing zone of the shingle 41, with the shank 49 of the fastener 42 being in secure engagement within the roof 40, and passing through the reinforcement material 46. Thus, especially when the reinforcement material 46 is a scrim, a fabric, or any other material that would tend to resist tearing, the fasteners 42 holding shingles on a roof 40, of the steepness shown, or even a steeper roof, would tend to resist movement of the shingle 41 under conditions of intense heat, and perhaps being walked upon by a worker, from tending to become disengaged from the roof, because the fasteners catch in the reinforcement material 46, and resist shingle 41 movement, for example from sliding down along the roof in the direction of the arrow 48.

Figure 4B:
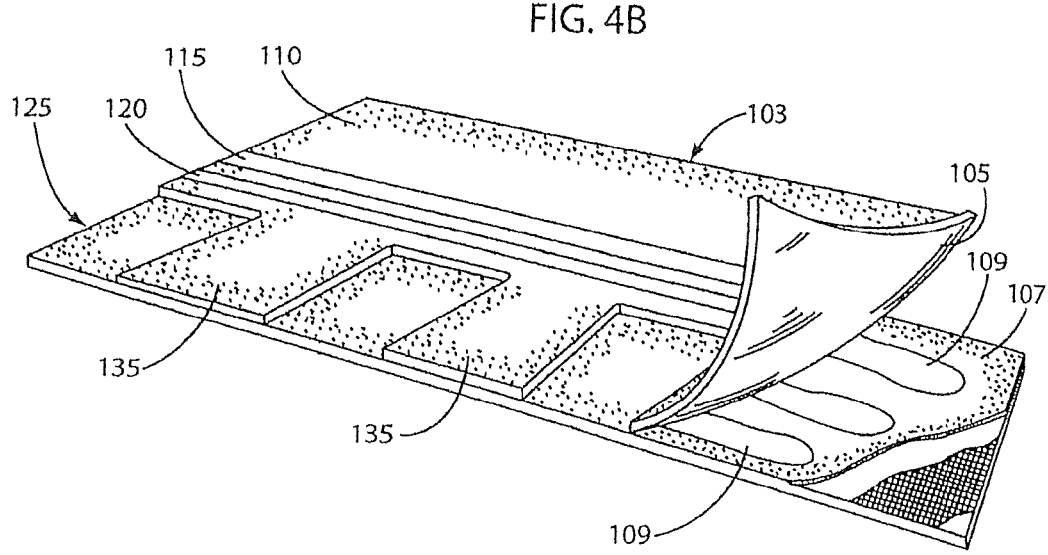
FIG. 4B is a top view of an exemplary laminated roofing shingle.

The preferred laminated roofing shingle 103 in accordance with the present invention is shown in FIG. 4B. The preferred laminated shingle 103 broadly comprises upper and lower layers 105, 107, respectively, joined by sealant 109. When viewed from the top or front, the shingle comprises a headlap area 110, a sealant line 115, a nail zone 120, and an exposed face area 125. The exposed face area 125 includes the portion of upper layer 105 including one or more cutouts which from a plurality of tabs 135, and the exposed portions of lower layer 107 underlying said portion of upper layer 105.

Although the shingle 103 depicted in the drawings is a two-ply laminated shingle, other shingle configurations of varying shapes and sizes (e.g., multi-ply shingles having two or more layers, three-tab or multiple tab shingles) are equally within the scope of the present invention.

Figure 4C:
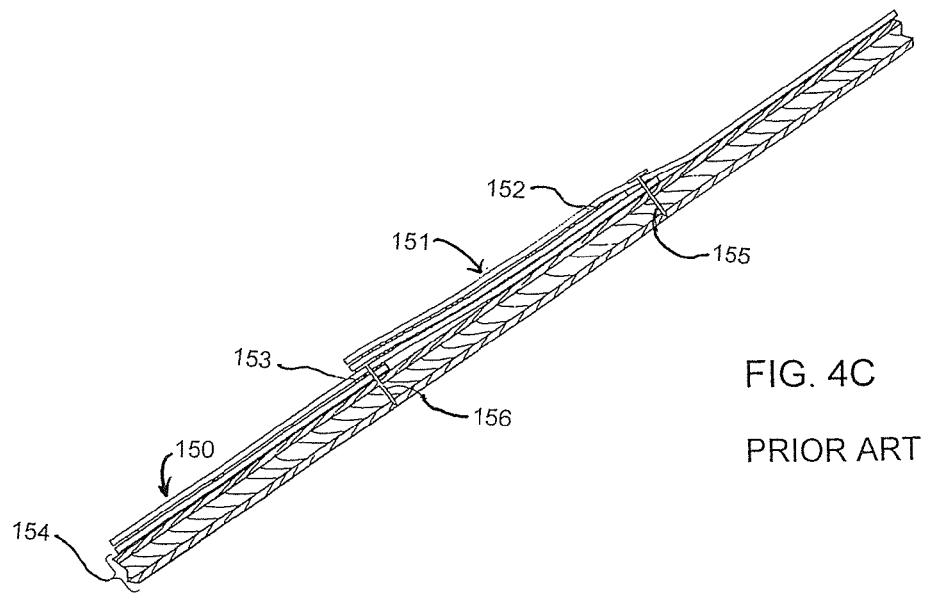
FIG. 4C is a side edge elevation view of two prior art laminated shingles as they are applied to a roof deck, showing one correctly applied fastener and one incorrectly applied fastener.

This so-called nail zone in the prior art shingles is shown in FIG. 4C. A shingle 150 in the first course of shingles is nailed to the roof deck 154 with a plurality of nails 156, only one of which is shown for the lowermost shingle 150. Nail 156 is shown correctly applied. The next adjacent shingle 151 in the next course of shingles is placed over shingle 150 in the first course and is nailed in place in a like manner. However, as may be seen, and to illustrate the problems associated with improperly applied fasteners, nail 155 is shown driven through only one layer of shingle 151 and in a position such that the nail is driven through only one layer of the laminated sheets. Nail 155 is thus driven through the shingle outside of the nail zone. The improper nailing is a direct result of a relatively narrow nail zone. And the nail zone is necessarily relatively narrow in view of the need to make the backing sheet no greater than ½ the width of the top sheet, which as mentioned is a design feature that facilitates stacking and bundling. However, the closer the nails are placed to the lowermost edge of the nail zone, the greater the possibility that water will leak through the nail hole, or that there will be exposed nails on the roof. Furthermore, roof integrity is comprised since the back sheet of shingle 151 may literally slip out from its attachment to the top sheet when the roof becomes hot and the adhesive material sloughs.

Figure 4D:
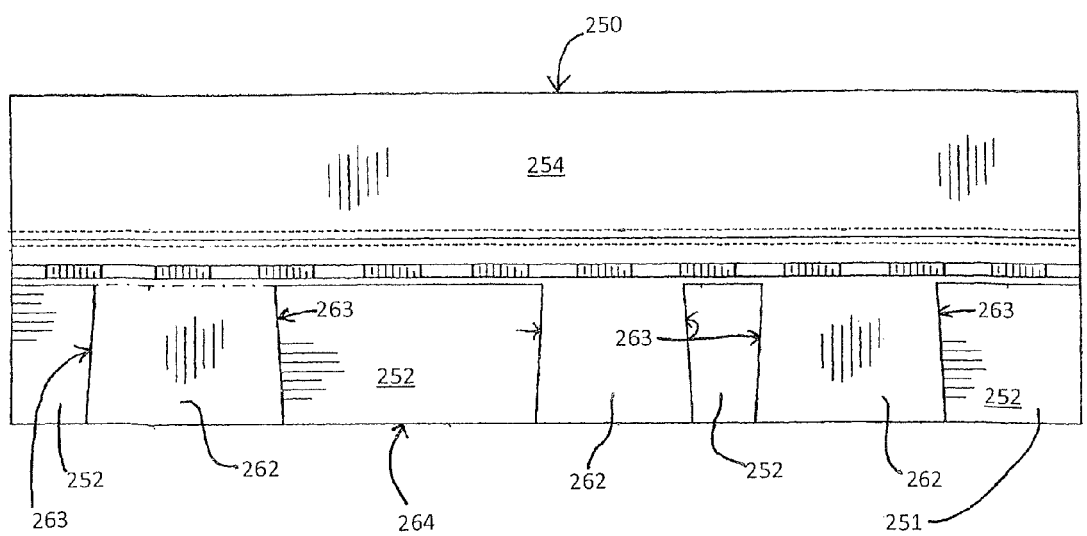
FIG. 4D is a top plan view of a laminated shingle according to the present invention.

Referring to FIG. 4D, shingle 250 may be seen as having a top sheet 254 with alternating tabs 262 leaving visible cutout portions 252 showing backing sheet 251, resulting in alternating tabs 262 and cutout portions formed along the lower longitudinal edge 264 of the top sheet 254. As can clearly be seen in FIG. 4D, the cutout portions are of various longitudinal dimensions left-to-right between edges 263 of tabs, such that portions of backing sheet 251 are visible through the openings 252 between tabs.

Reference will now be made to the graphs of FIGS. 5-8, for representative benefits achieved by using a scrim applied to shingles in the manner discussed above, for various weights of shingles having difference mats, and under the same temperature conditions, for comparison purposes.

Figure 5:
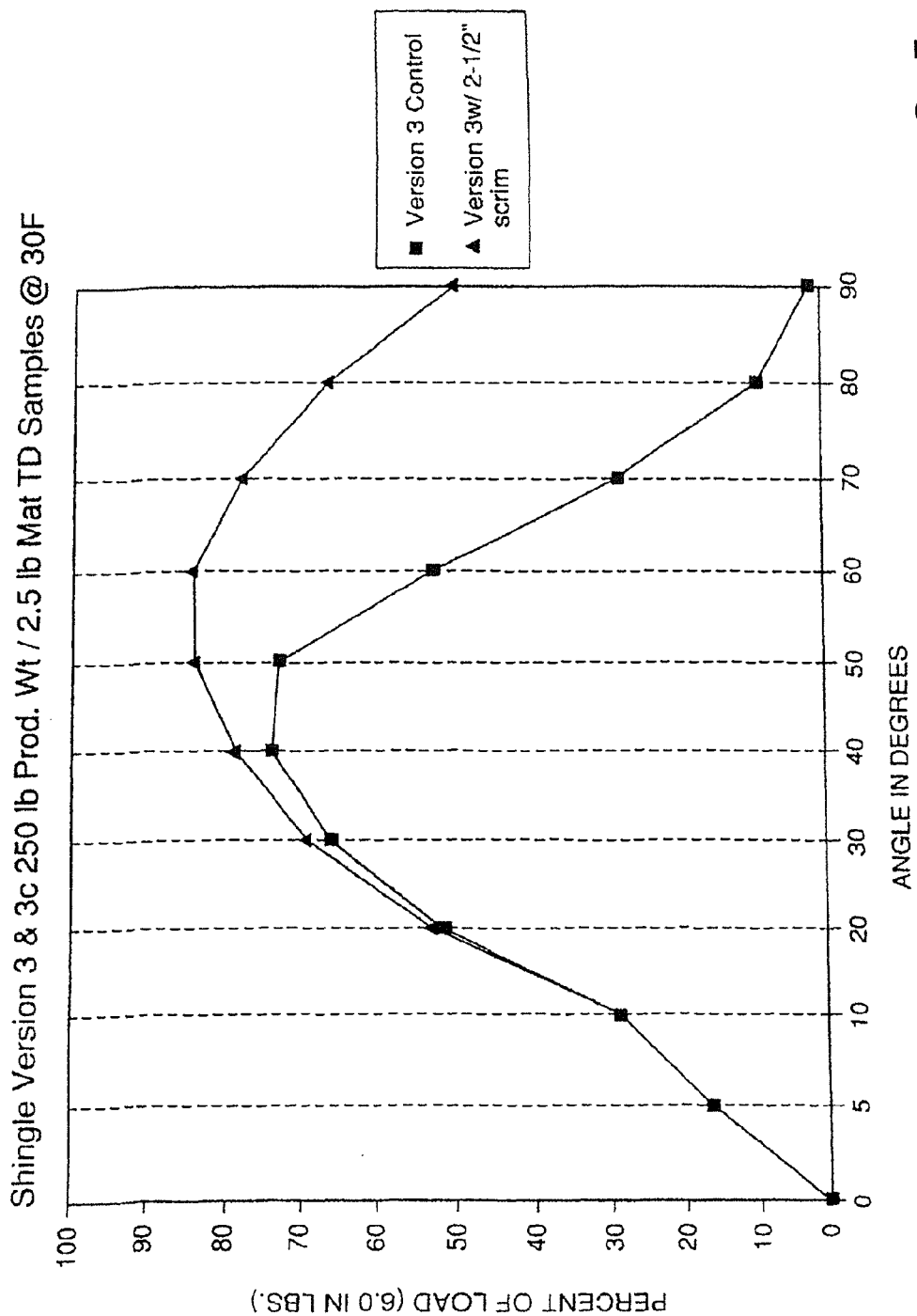
FIG. 5 is a graph showing an example of the absorption of wind-lifting torque upon bending a particular weight of shingle through various angular degrees and the improvement of providing a reinforcement material in accordance with this invention under the same lifting conditions.

With reference to FIG. 5, it will be seen that a shingle version is identified as version 3, with its control identified as version 3C, each being a 250 lb. shingle, in weight per square (1 square equals enough shingles to cover 100 ft$^2$ of roof) and with 2.5 lb. mat. (in weight per 100 square feet of mat). In each case, the samples were tested at 30° F. The ordinate or vertical measure in the graph is the percent of the applied force or load that is absorbed by the shingle at a given degree of angular bend, as shown in degrees on the abscissa or horizontal line of the chart, under a fixed torque applied to the shingle tab portion, of 6.0 inch-lbs. It will be seen that for the control shingle of FIG. 5, failure, or inelastic bending to the point that the shingle does not return to its original, flat condition when the force of wind is removed, occurred at about 40° of angular bend, with failure being defined as a crack or permanent bend as distinguished from a bend within the elastic limit. However, for the shingle having a scrim of 2½ inches in width, as shown in FIG. 2, it will be seen that in FIG. 5 that shingle with the scrim remained within its elastic limit up to about 60° of angular bend, prior to failure. It will thus be seen that the specimen graphed in FIG. 5 having a scrim applied thereto absorbed about 75% of the torque load applied thereto, for a bend of the tab portion of the shingle of about 60°, before failure.

Figure 6:
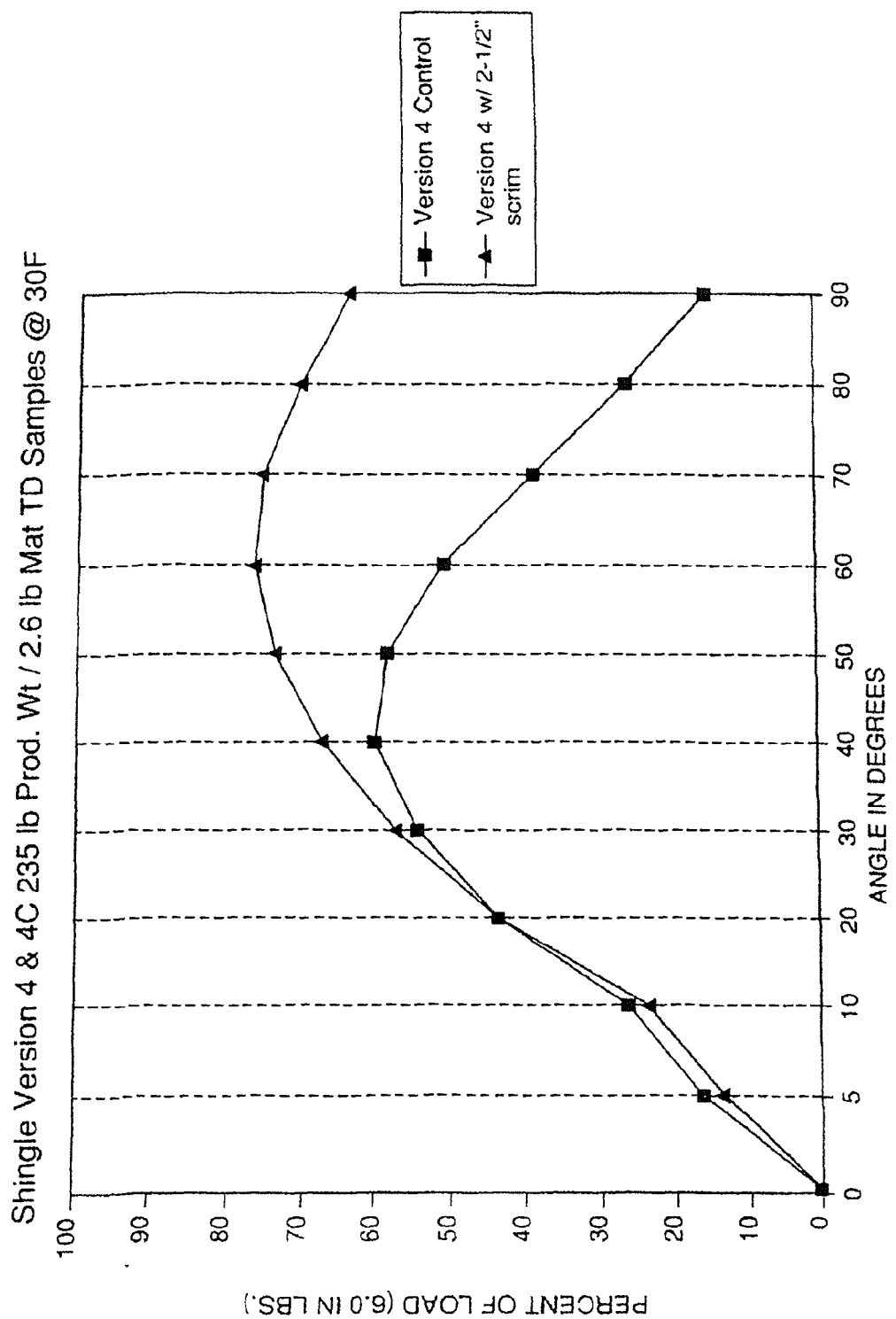
FIG. 6 is a view similar to that of FIG. 5, for a somewhat different weight of shingle, and a different weight of mat for the shingle.

Referring now to FIG. 6, wherein a version 4 was matched against a control version 4C, for a 235 lb. weight of shingle having a 2.6 lb. mat, again at 30°, the control version absorbed about 60% of the torque that was applied, up to about 40° of angular bend, whereas the specimen graphed in FIG. 6 having a 2½ inch wide scrim applied thereto absorbed about 77% of the applied torque load, when subjected to a bend of 60°, before failure.

Figure 7:
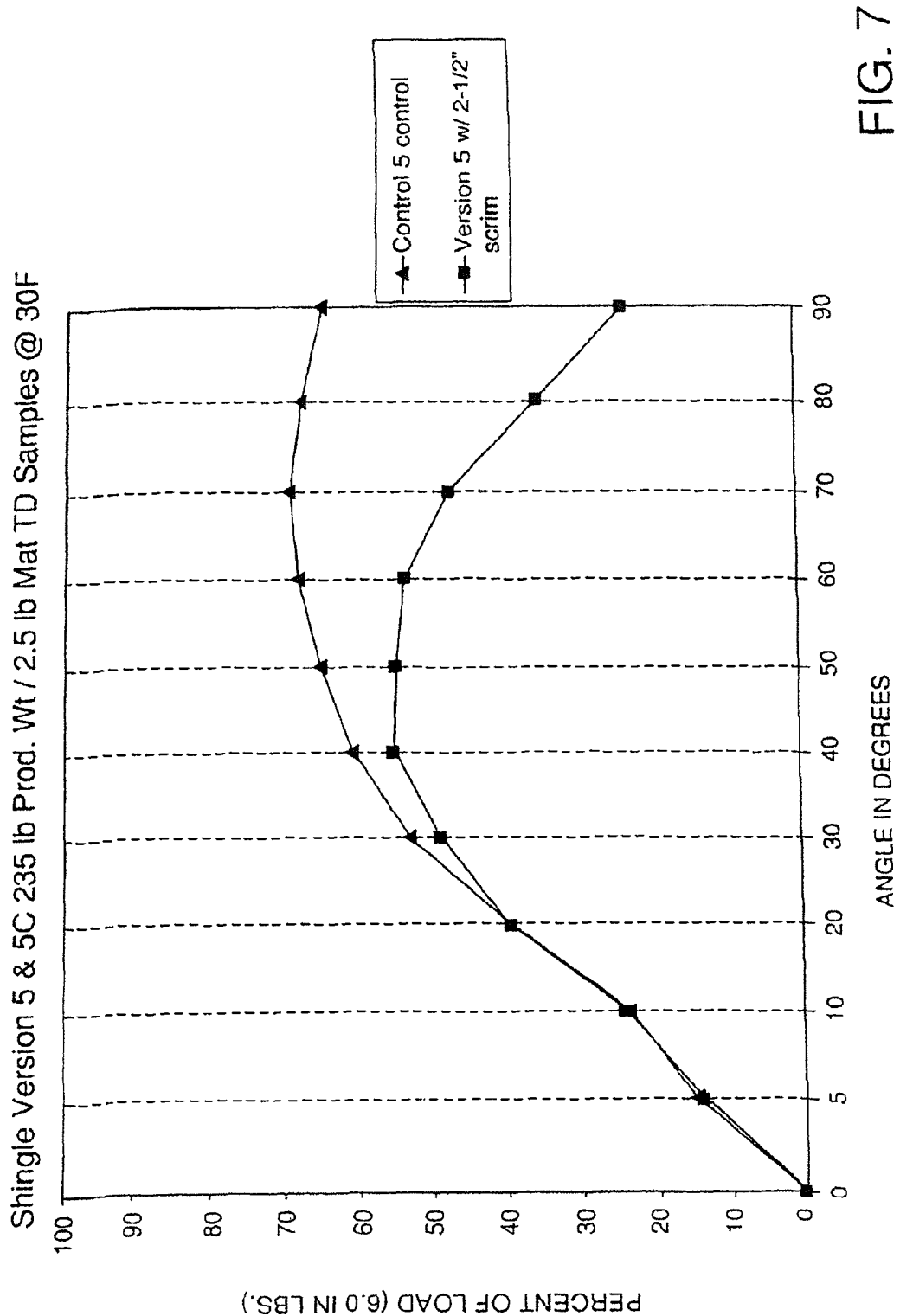
FIG. 7 is an illustration similar to that of FIGS. 5 and 6 for a differently constructed shingle.

Referring now to FIG. 7, wherein yet another shingle 5 was tested against a control shingle 5C, with the shingle graphed in FIG. 7, like that of FIG. 6, also being a 235 lb. weight per stack, but having a 2.5 lb. mat, and likewise having a 2½ inch wide scrim, it will be seen that, whereas the control version absorbed only about 55% of the applied torque at about a 40° bend, the version with the scrim applied thereto absorbed about 70% of the applied load, when bent about 70°. Thus, the effect of a slightly thinner mat was noted for a shingle with scrim applied thereto.

Figure 8:
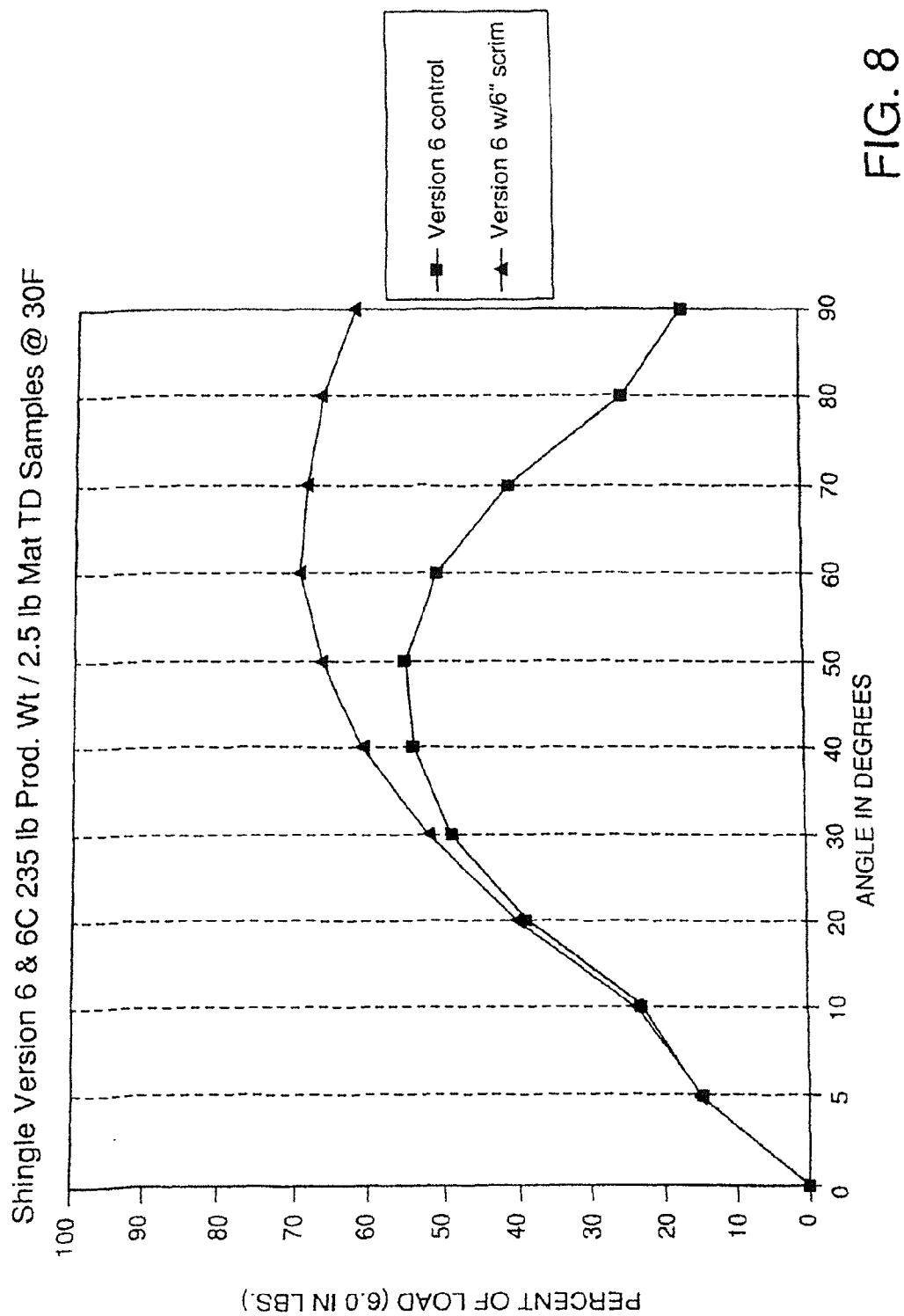
FIG. 8 is a graph similar to that of FIG. 7, for a shingle have a wider reinforcement layer.

With reference now to FIG. 8, it will be seen that shingle versions 6 and control shingles 6C were also shown as comprising a 235 lb. shingle by weight, and a 2½ lb. mat, but wherein, unlike the similar specimen indicated for FIG. 7, the specimen graphed in FIG. 8 had a 6 inch wide scrim applied thereto. It will be seen that the control version of FIG. 8 tested similarly to that of the control version of FIG. 7, and that the version with the 6 inch scrim applied thereto likewise tested similarly to that of the scrim-applied version of FIG. 7.

It has thus been found that the bending tests, performed with a Tinius-Olsen Flexibility Tester to apply the force bending the shingle tab portions 44 in the direction of the arrow 45 of FIG. 4 all show that the specimens with scrim reinforcement embedded on their rear sides exhibit improved resistance to failure upon bending, and thus are capable of maintaining and carrying applied stress due to bending to much higher degrees than shingle specimens without the scrim. Thus, shingles with the scrim applied thereto in accordance with this invention provide improved resistance to damage due to wind uplift.

Nail pull tests were run on a plurality of shingles, with and without reinforcement layers. The tests were run on 4 inch by 4 inch specimens, placed over a plate having a ½ inch center hole, with the nail being driven through the shingle, so as to place the nail at the center of the 2½ inch hole, which in turn is at the center of the 4 inch by 4 inch plate, and with the nail then being pulled upwardly to determine the strength of the shingle in resisting failure or tearing against the force of the nail pull. This is a standardized test for shingles pursuant to ASTM.

First, ten specimens of control shingles were tested, having no reinforcement layer on their rear surface. The resistance strength of the control samples prior to failure, averaged 29.69 lb.±3.78 lb. deviation over the ten shingles tested.

Next, ten specimens of the same type of shingle as the control shingle were tested, but which deviated from the control shingle, in that they had a 17 gram polyester mat reinforcement layer on their rear surfaces. The resistance strength of these specimen resisting the nail pull, prior to failure, averaged 33.27 lb.±3.52 lb. deviation over the ten specimens tested.

Then, ten specimens of shingle constructed the same as the control shingles, but different from the control shingles in that they each had a reinforcement layer on the rear surface, of 30 gram polyester mat. The resistance strength, of these specimens in resisting the nail pull prior to failure averaged 36.96 lb.±3.98 lb. deviation over the ten specimens tested.

Then, ten specimens of the same type of specimens as the control shingle were tested, but wherein the reinforcement layer was a fiberglass scrim having nine strands in the vertical direction and nine strands in the horizontal direction per square inch (9×9 per in$^2$). The ten specimens with the fiberglass scrim on the rear surface averaged 54.13 lb. resistance to the nail pull test prior to failure, ±4.02 lb. deviation over the ten specimens tested.

These nail pull strength tests thus revealed that the fiberglass scrim as a reinforcement layer provided the greatest resistance prior to failure, although each of the 17 gram polyester mat and 30 gram polyester mat provided greater resistance prior to failure than the control specimens without any reinforcement layer.

It will thus be seen that, when nails or other fasteners are applied to the shingle, for fastening the shingle to a roof, they pass through the reinforcement layer. This more securely fastens the shingle to a roof, and is especially desirable when applied to roofs having steep slopes, in that it can sometimes occur on very hot sunny days, on a steep roof, perhaps with workmen walking on the roof, that the stress on the shingle can cause the shingle to tear above the fastening points and perhaps become dislodged from the roof. By fastening the shingle to a roof through the reinforcement zone in such a situation, the fasteners are more prone to maintain the shingle adhered to the roof. This can be especially so if the reinforcement material that is applied to the rear of the roof comprises a scrim of crossing strands, a fabric, or other material that is resistant to tearing.

It will be apparent from the forgoing that various modifications may be made in the details of construction, as well as with the use of shingles of this invention, all within the spirit and scope of the invention as defined in the appended claims.

What is claimed is:

1. An array of shingles applied to a roof, by fasteners, in courses, each shingle having front and rear exterior surfaces and being comprised of shingle material, with the shingle having a width defined by upper and lower edges and a length defined by right and left edges, the shingle comprising:
   (a) a base layer of mat having front and rear surfaces;
   (b) a coating of asphaltic material on both front and rear surfaces of the mat;
   (c) coatings of granular material on said both front and rear surfaces of the mat, which, together with said base layer of mat and said coating of asphaltic material comprise a first thickness layer;
   (d) a longitudinal fastening zone between right and left shingle edges, generally intermediate said upper and lower edges;
   (e) and an at least partially externally visible generally longitudinal reinforcement second thickness layer of a substantially thinner dimension than said first thickness layer; said reinforcement second thickness layer being adhered to an exterior surface of said shingle and extending at least substantially between right and left edges of the shingle; and
   (f) said reinforcement second thickness layer extending at least partially lower than the fastening zone, toward the lower edge of the shingle or at least partially into the fastening zone toward the upper edge of the shingle.

2. The array of shingles applied to a roof according to claim 1, wherein each shingle is comprised of a single layer of shingle material with the front and rear surfaces being on opposite sides of the single layer of shingle material.

3. The array of shingles applied to a roof according to claim 1, wherein each shingle is comprised of at least two layers of shingle material laminated together, with the front and rear surfaces being on opposite sides of the single.

4. The array of shingles applied to a roof according to claim 3, wherein the reinforcement second thickness layer extends at least partially lower than the fastening zone, toward the lower edge of the shingle.

5. The array of shingles applied to a roof according to claim 3, wherein the reinforcement second thickness layer extends at least partially into the fastening zone, toward the upper edge of the shingle.

6. The array of shingles applied to a roof according to claim 1, wherein the reinforcement second thickness layer comprises a material selected from the group consisting of woven or non-woven:
   (i) thin fabric;
   (ii) plastic film;
   (iii) paper;
   (iv) parchment;
   (v) foil; and
   (vi) scrim.

7. The array of shingles applied to a roof according to claim 1, wherein the reinforcement second thickness layer comprises means for increasing resistance to nail pull prior to failure.

8. The array of shingles applied to a roof according to claim 1, wherein the reinforcement second thickness layer extends at least partially lower than the fastening zone, toward the lower edge of the shingle.

9. The array of shingles applied to a roof according to claim 1, wherein reinforcement second thickness layer extends at least partially into the fastening zone, toward the upper edge of the shingle.

10. The array of shingles applied to a roof according to claim 9, including fasteners applied through the reinforcement second thickness layer, fastening the shingles to the roof.

11. A method of applying an array of shingles to a roof, by fasteners, in courses, comprising the steps making a shingle having front and rear exterior surfaces and being comprised of shingle material, with the shingle having a width defined by upper and lower edges and a length defined by right and left edges, comprising the further steps of:
   (a) providing a base layer of mat having front and rear surfaces;
   (b) providing a coating of asphaltic material on both said front and rear surfaces of the mat;
   (c) providing coatings of granular material on the asphaltic material on said both front and rear surfaces, so that the structures of clauses (a), (b) and (c) comprise a first thickness layer;
   (d) providing a longitudinal fastening zone between right and left shingle edges, generally intermediate said upper and lower shingle edges;
   (e) providing an at least partially externally visible generally longitudinal reinforcement second thickness layer of a substantially thinner dimension than said first thickness layer; and adhering the reinforcement second thickness layer to an exterior surface of the shingle, extending at least substantially between right and left edges of the shingle;
   (f) making the reinforcement second thickness layer extend at least partially lower than the fastening zone or at least partially into the fastening zone; and
   (g) fastening the shingles to a roof, in courses.

12. The method of claim 11, wherein each shingle is comprised of a single layer of shingle material, with the front and rear surfaces being on opposite sides of the single layer of shingle material.

13. The method of claim 11, wherein each shingle is comprised of a at least two layers of shingle material, including the step of laminating the at least two layers of shingle material together, with the front and rear surfaces of the shingle being on opposite sides of the shingle.

14. The method of claim 11, including the step of extending the reinforcement second thickness layer of each shingle at least partially lower than the fastening zone, toward the lower edge of the shingle.

15. The method of claim 11, including the step of extending the reinforcement second thickness layer of each shingle at least partially into the fastening zone, toward the upper edge of the shingle.

16. The method of claim 15, including the step of applying fasteners through the reinforcement second thickness layers of the shingles, fastening the shingles to the roof.

17. A shingle having front and rear exterior surfaces and being comprised of shingle material, with the shingle having a width defined by upper and lower edges and a length defined by right and left edges, the shingle comprising:
   (a) a base layer of mat having front and rear surfaces;
   (b) a coating of asphaltic material on both front and rear surfaces of the mat;
   (c) coatings of granular material on said both front and rear surfaces of the mat, which, together with said base layer of mat and said coating of asphaltic material comprise a first thickness layer;
   (d) a longitudinal fastening zone between right and left shingle edges, generally intermediate said upper and lower edges;
   (e) and an at least partially externally visible generally longitudinal reinforcement second thickness layer of a substantially thinner dimension than said first thickness layer; said reinforcement second thickness layer being adhered to an exterior surface of said shingle and extending at least substantially between right and left edges of the shingle;
   (f) said reinforcement second thickness layer extending at least partially lower than the fastening zone, toward the lower edge of the shingle or at least partially into the fastening zone toward the upper edge of the shingle;
   (g) wherein each shingle is comprised of at least two layers of shingle material laminated together, with the front and rear surfaces being on opposite sides of the shingle; and
   (h) wherein the at least two layers of shingle material comprise a top sheet and a backing sheet, with the top sheet including a plurality of alternating tabs and cut out portions along a lower longitudinal edge of the top sheet, with portions of the backing sheet being visible through the cutout portions being defined by edges of the tabs and with the cutout portions being of a plurality of longitudinal dimensions.

18. An array of shingles according to claim 17, applied to a roof, in courses.

\* \* \* \* \*